United States Patent
Enot et al.

(10) Patent No.: US 11,572,947 B2
(45) Date of Patent: Feb. 7, 2023

(54) GEAR SHIFT CALIBRATION

(71) Applicant: Caterpillar Paving Products Inc., Brooklyn Park, MN (US)

(72) Inventors: Ryan Adam Enot, Dunlap, IL (US); Nathaniel Doy, Maple Grove, MN (US); Brian Joe Schlenker, Shoreview, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 67 days.

(21) Appl. No.: 17/303,751

(22) Filed: Jun. 7, 2021

(65) Prior Publication Data
US 2022/0390009 A1 Dec. 8, 2022

(51) Int. Cl.
| | |
|---|---|
| *F16H 61/28* | (2006.01) |
| *F16H 61/00* | (2006.01) |
| *F16H 3/091* | (2006.01) |
| *E01C 23/06* | (2006.01) |

(52) U.S. Cl.
CPC .......... *F16H 61/28* (2013.01); *F16H 3/0915* (2013.01); *E01C 23/065* (2013.01); *F16H 2061/0068* (2013.01); *F16H 2061/283* (2013.01); *F16H 2200/0034* (2013.01)

(58) Field of Classification Search
CPC ............. F16H 61/28; F16H 2061/0068; F16H 2061/283
USPC ......................................................... 74/335
See application file for complete search history.

(56) References Cited

U.S. PATENT DOCUMENTS

| | | | | |
|---|---|---|---|---|
| 6,301,537 | B1* | 10/2001 | Walker | .................... F16H 59/70 74/473.1 |
| 6,717,417 | B2* | 4/2004 | Jungbauer | ............... F16H 59/70 324/207.13 |
| 10,648,557 | B2 | 5/2020 | Karlsson et al. | |
| 2004/0128051 | A1* | 7/2004 | Boll | ...................... F16D 48/066 701/67 |
| 2006/0162476 | A1* | 7/2006 | Zimmermann | ..... F16H 61/2807 74/335 |
| 2012/0143447 | A1* | 6/2012 | Litscher | ................ B60W 50/02 701/1 |
| 2017/0138469 | A1 | 5/2017 | Gillella et al. | |

FOREIGN PATENT DOCUMENTS

| | | |
|---|---|---|
| DE | 101 49 529 A1 | 7/2002 |
| DE | 10 2008 048 506 A1 | 3/2010 |

* cited by examiner

*Primary Examiner* — Ha Dinh Ho
(74) *Attorney, Agent, or Firm* — Harrity & Harrity LLP

(57) ABSTRACT

In some implementations, a controller may cause a gearbox coupled to a rotor to shift between a first gear ratio and a second gear ratio one or more times. The controller may obtain a first set of position data that identifies respective first positions of a gear selector of the gearbox for each shift to the first gear ratio, and a second set of position data that identifies respective second positions of the gear selector of the gearbox for each shift to the second gear ratio. The controller may determine a first calibrated position of the gear selector for a shift to the first gear ratio based on the first set of position data and a second calibrated position of the gear selector for a shift to the second gear ratio based on the second set of position data.

20 Claims, 4 Drawing Sheets

GEAR SHIFT CALIBRATION

TECHNICAL FIELD

The present disclosure relates generally to gearboxes and, for example, to gear shift calibration for a gearbox.

BACKGROUND

A rotary mixer may be used to cut, mix, and pulverize ground surfaces, such as a roadway. In general, a rotary mixer includes a frame supported by wheels, or endless tracks. The frame provides support for an operator station and a power source. The rotary mixer includes an open bottom mixing chamber connected to the frame, and a rotor suspended inside the mixing chamber. The rotor may include a rotatable drum having work tools disposed about an outer surface of the drum to cut, mix, and pulverize ground surface.

The rotor may be controlled by a gearbox (e.g., a two-position gearbox with a low gear and a high gear) that provides a drive ratio of the rotor. An operator of the rotary mixer may shift to a gear using an operator control (e.g., located in the operator station), such as a button, that provides a command to shift to the gear. In response to the command, the rotary mixer may shift to the commanded gear in an automated manner. For example, to shift to the commanded gear, a gear selector (e.g., a shift fork) may be moved to a position that selects the commanded gear. In some cases, the shift that is carried out may not achieve a full shift to the commanded gear (e.g., the gear selector is not moved to the proper position), such that gears of the gearbox are not properly seated into position and/or are not properly meshed. In such cases, if the rotor is engaged, the gears (e.g., teeth of the gears) and/or other mechanisms of the gearbox may be damaged.

U.S. Patent Application Publication No. 20170138469 (the '469 publication) discloses a method for updating shift position thresholds for a multi-speed transmission. The '469 publication indicates that the multi-speed transmission includes a position sensor for providing data indicative of a position of a shift actuator for selecting between a plurality of gear ratios. The '469 patent discloses that the method includes comparing a velocity of an output member to a prescribed velocity, and upon the velocity of the output member increasing and being less than the prescribed velocity, storing the position provided by the position sensor as a synchronization position. Further, the '469 patent discloses that upon the velocity of the output member corresponding to the prescribed value, the method includes storing the position provided by the position sensor as an endstop position, and calculating a threshold position for the shift actuator based on the synchronization position and the endstop position. However, the '469 publication does not address calibration of a gearbox used for a rotor, such as a rotor of a rotary mixer. Moreover, the '469 patent does not describe the use of a contactless sensor for detecting position.

The gearbox calibration system of the present disclosure solves one or more of the problems set forth above and/or other problems in the art.

SUMMARY

In some implementations, a gearbox calibration system includes a gearbox configured to operate using at least a first gear ratio and a second gear ratio, the gearbox including a gear selector configured to select the first gear ratio or the second gear ratio for the gearbox; at least one sensor configured to detect a position of the gear selector; a rotor drum coupled to an output of the gearbox; and a controller configured to: cause the gearbox to shift between the first gear ratio and the second gear ratio one or more times; obtain, using the at least one sensor, a first set of position data that identifies respective first positions of the gear selector for each shift to the first gear ratio, and a second set of position data that identifies respective second positions of the gear selector for each shift to the second gear ratio; and determine a first calibrated position of the gear selector for a shift to the first gear ratio based on the first set of position data and a second calibrated position of the gear selector for a shift to the second gear ratio based on the second set of position data.

In some implementations, a method includes causing, by a controller, a gearbox coupled to a rotor to shift between a first gear ratio and a second gear ratio one or more times; obtaining, by the controller using at least one sensor, a first set of position data that identifies respective first positions of a gear selector of the gearbox for each shift to the first gear ratio, and a second set of position data that identifies respective second positions of the gear selector of the gearbox for each shift to the second gear ratio; and determining, by the controller, a first calibrated position of the gear selector for a shift to the first gear ratio based on the first set of position data and a second calibrated position of the gear selector for a shift to the second gear ratio based on the second set of position data.

In some implementations, a rotary mixer includes a gearbox configured to operate using at least a first gear ratio and a second gear ratio, the gearbox including a gear selector configured to select the first gear ratio or the second gear ratio for the gearbox; a rotor coupled to an output of the gearbox; a clutch coupled to an input of the gearbox; an actuator configured to control the clutch; a sensor configured to detect a position of the gear selector; and a controller configured to: cause the gearbox to shift between the first gear ratio and the second gear ratio one or more times; pulse the actuator between an on state and an off state one or more times after each shift between the first gear ratio and the second gear ratio; obtain, using the sensor, a first set of position data that identifies respective first positions of the gear selector for each shift to the first gear ratio, and a second set of position data that identifies respective second positions of the gear selector for each shift to the second gear ratio; and determine a first calibrated position of the gear selector for a shift to the first gear ratio based on the first set of position data and a second calibrated position of the gear selector for a shift to the second gear ratio based on the second set of position data.

DETAILED DESCRIPTION

This disclosure relates to a gearbox calibration system, which is applicable to any machine that uses a transmission.

For example, the machine may use the transmission to drive a work implement of the machine.

Figure 1:
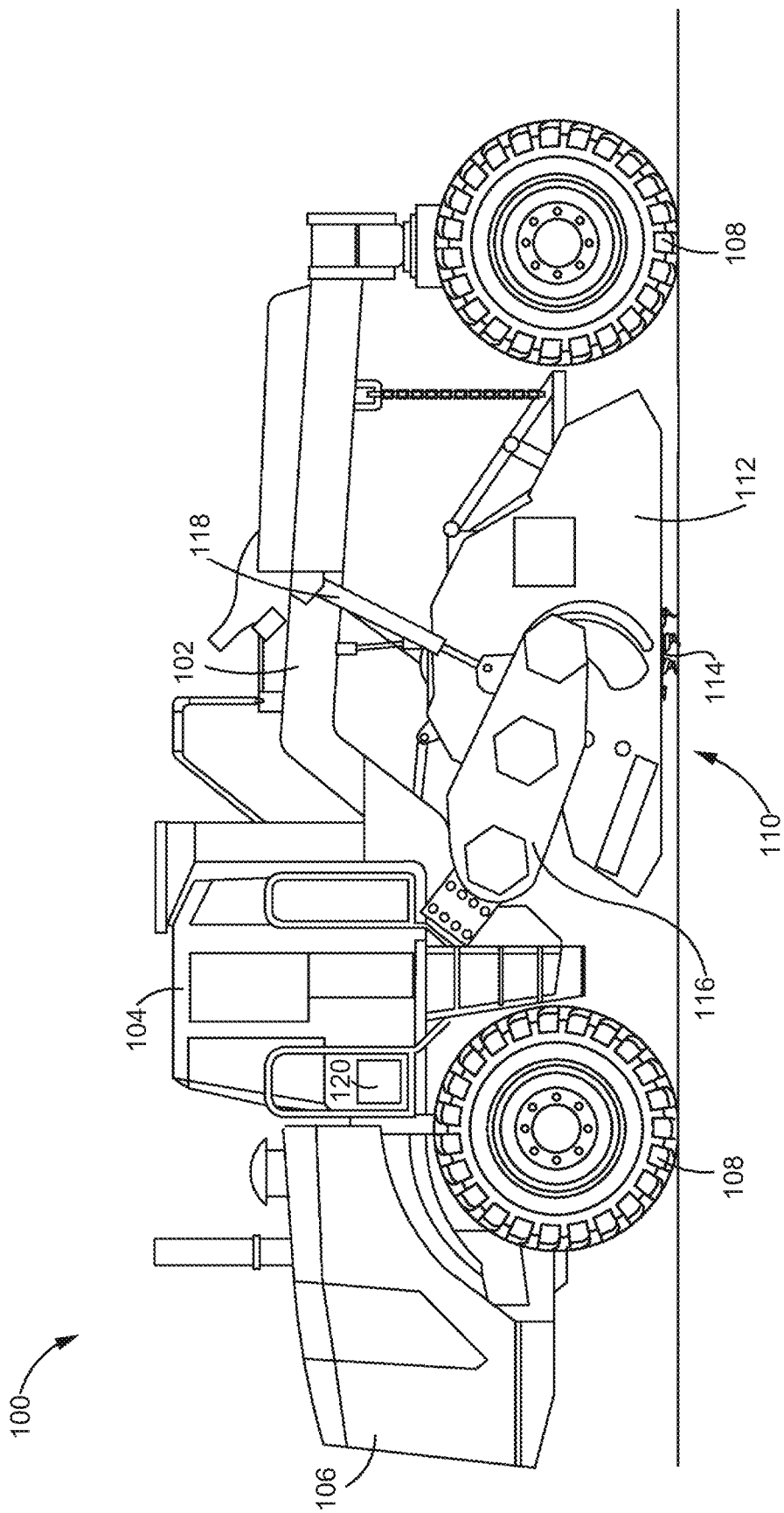
FIG. 1 is a diagram of an example machine, described herein.

FIG. 1 is a diagram of an example machine 100 described herein. The machine 100 is shown as a rotary mixer in FIG. 1; however, the present disclosure is also applicable to other machines, such as milling machines, paving machines, cold planers, or the like.

The machine 100 includes a frame 102 with an operator cab 104. The operator cab 104 provides an enclosure to house one or more operators of the machine 100. The operator cab 104 may include a plurality of control elements, such as a joystick, a lever, a switch, a button, a monitor, a touch screen, or the like, that can be utilized by an operator to control and operate the work machine. In some examples, the machine 100 may be configured to allow for remote operation, such that the operator may control the machine 100 from a location other than the operator cab 104. In some examples, the machine 100 may be configured to operate autonomously, such that the operator cab 104 may be eliminated or provisioned with a reduced set of control elements.

The machine 100 includes a power source 106 supported by the frame 102. The power source 106 may include an internal combustion engine, an electric motor, a hybrid engine, or another type of power source. The power source 106 supplies the power for operating various systems of the machine 100. A set of ground engaging elements 108, shown as wheels, are mounted to the frame 102 and operably coupled to the power source 106. The ground engaging elements 108 may additionally or alternatively include tracks.

The machine 100 includes a mixing chamber 110 disposed between a front set of ground engaging elements 108 and a rear set of ground engaging elements 108; however, other locations for the mixing chamber 110 are possible. The mixing chamber 110 includes a first side plate 112 and a second side plate (not shown) opposite to the first side plate 112. Furthermore, the first side plate 112 and the second side plate of the mixing chamber 110 may define an enclosure for a rotor 114. Moreover, the rotor 114 may be operably coupled to the mixing chamber 110, and the rotor 114 may be configured to rotate within the enclosure defined by the mixing chamber 110. The rotor 114 may include a rotor drum and a plurality of work tools (e.g., cutting bits) disposed about an outer surface of the rotor drum.

The machine 100 includes a rotor drive train 116 coupled to the frame 102. The rotor drive train 116 may be operably coupled to the power source 106 via a drive rod (not shown) or other power output device. The rotor drive train 116 may be rotatably driven by the drive rod, and the rotor drive train 116 subsequently rotatably drives the rotor 114 within the mixing chamber 110. The mixing chamber 110 may be connected to one or more hydraulic cylinders 118 that are coupled to the frame 102. The hydraulic cylinders 118 may be activated by the operator to raise and lower the mixing chamber 110 relative to a ground surface.

Additionally, a controller 120 (e.g., an electronic control module (ECM)) may be mounted within the operator cab 104 (or another part of the machine 100). The controller 120 may include one or more memories and/or one or more processors that implement operations associated with gear shift calibration, as described herein. For example, the controller 120 may be configured to cause a gearbox to shift between a first gear ratio and a second gear ratio one or more times, obtain a first set of position data that identifies respective first positions of the gear selector for each shift to the first gear ratio and a second set of position data that identifies respective second positions of the gear selector for each shift to the second gear ratio, and determine a first calibrated position of the gear selector for a shift to the first gear ratio based on the first set of position data and a second calibrated position of the gear selector for a shift to the second gear ratio based on the second set of position data, as described herein.

As indicated above, FIG. 1 is provided as an example. Other examples may differ from what is described with regard to FIG. 1.

Figure 2:
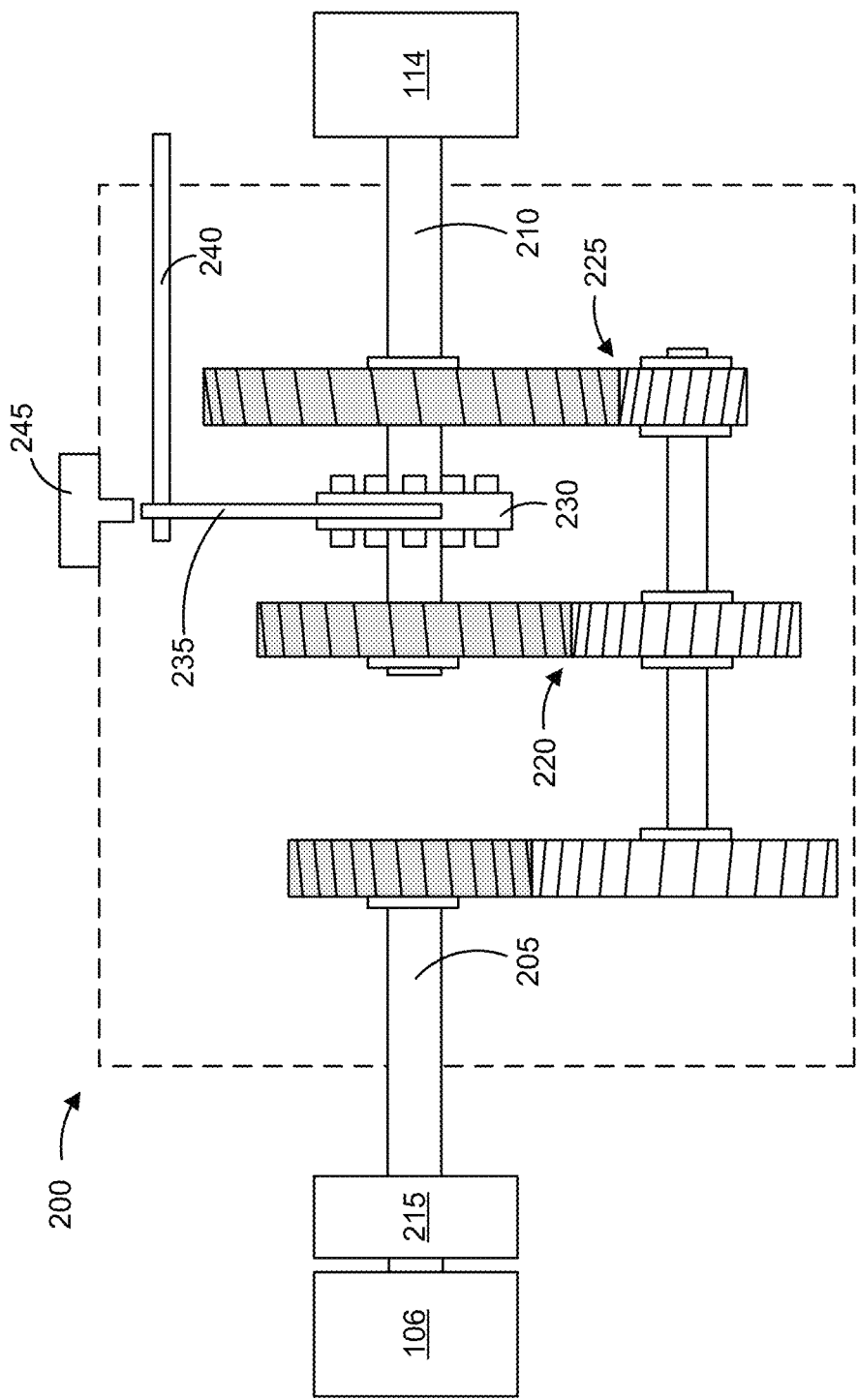
FIG. 2 is a diagram of an example gearbox, described herein.

FIG. 2 is a diagram of an example gearbox 200 described herein. The gearbox 200 may be a component of the rotor drive train 116, described herein. As shown, an input of the gearbox 200 is connected to an input shaft 205 (also referred to as a "clutch shaft") and an output of the gearbox 200 is connected to an output shaft 210 (also referred to as a "main shaft"). The input of the gearbox 200 is coupled (e.g., via the input shaft 205 and/or a belt) to a clutch 215 (e.g., a main clutch), which is coupled to the power source 106. The output of the gearbox 200 is coupled (e.g., via the output shaft 210 and/or a belt) to the rotor 114 (e.g., to the rotor drum of the rotor).

The gearbox 200 may be a multi-speed gearbox (i.e., a multi-position gearbox). For example, the gearbox 200 may be configured to operate using at least a first gear ratio (e.g., a lower gear ratio) and a second gear ratio (e.g., a higher gear ratio). The gearbox 200 may also operate in neutral when neither of the first gear ratio or the second gear ratio is selected. As shown, the gearbox 200 includes a first set of gears 220 associated with the first gear ratio (which may be referred to as a "first gear" or a "low gear" of the gearbox 200) and a second set of gears 225 associated with the second gear ratio (which may be referred to as a "second gear" or a "high gear" of the gearbox 200). The gearbox 200 is shown as a two-position gearbox for illustration purposes, and in practice, the gearbox 200 may be configured to operate using more than two gear ratios, such as three gear ratios, four gear ratios, or five gear ratios. In some examples, the gearbox 200 may be a constant mesh gearbox as shown; however, the present disclosure is equally applicable to a sliding mesh gearbox.

The gearbox 200 includes a gear engagement member 230 (e.g., a dog clutch or a synchronizer). The gear engagement member 230 may be slidably coupled to the output shaft 210, on which driven gears of the first set of gears 220 and the second set of gears 225 rotate. In connection with a shift to a gear ratio associated with a set of gears, the gear engagement member 230 may engage the set of gears with the output shaft 210.

The gearbox 200 includes a gear selector 235. The gear selector 235 may be a shift fork. The gear selector 235 is configured to select the first gear ratio or the second gear ratio for the gearbox 200. For example, the gear selector 235 is coupled to the gear engagement member 230 and configured to slide the gear engagement member 230 on the output shaft 210 in response to actuation of a actuation shaft 240 (e.g., in response to a command from an operator to shift gears). As an example, for a shift to the first gear ratio, associated with the first set of gears 220, the gear selector 235 (e.g., via actuation of the actuation shaft 240) may slide the gear engagement member 230 into engagement with the first set of gears 220. Similarly, for a shift to the second gear ratio, associated with the second set of gears 225, the gear selector 235 (e.g., via actuation of the actuation shaft 240) may slide the gear engagement member 230 into engagement with the second set of gears 220. In a sliding mesh gearbox (not shown), the gear selector 235 may slide a driven gear (in a similar manner in which the gear selector 235 slides the gear engagement member 230) into engagement with a drive gear to mesh the driven gear and the drive gear.

At least one sensor 245 may be connected to the gearbox 200. The sensor 245 may be a position sensor (e.g., a proximity sensor) configured to detect a position of the gear selector 235, and to generate a signal indicative of the position of the gear selector 235. The sensor 245 may include an inductive sensor, a resistive sensor, a Hall effect sensor, a linear variable differential transformer (LVDT) sensor, an optical sensor, and/or an ultrasonic sensor, among other examples.

The sensor 245 may be a contactless sensor (e.g., with respect to the gear selector 235). That is, the sensor 245 may be configured to detect the position of the gear selector 235 without contacting the gear selector 235. The sensor may be disposed on the gearbox 200 remotely from the gear selector 235. For example, the sensor 245 may be mounted to a surface (e.g., an outer surface) of a case (shown in dashed line) of the gearbox 200. The sensor 245 may include a probe end that extends (e.g., through the case) toward the gear selector 235. In some examples, the probe end of the sensor 245 may be received in (e.g., without contacting) a sensor receptacle (not shown) of the gear selector 235. The sensor receptacle may be a notched, grooved, forked, or the like, member of the gear selector 235 that partially surrounds the probe end of the sensor 245. Thus, during movement of the gear selector 235, the sensor receptacle slides relative to the probe end of the sensor 245.

As indicated above, FIG. 2 is provided as an example. Other examples may differ from what is described with regard to FIG. 2.

Figure 3:
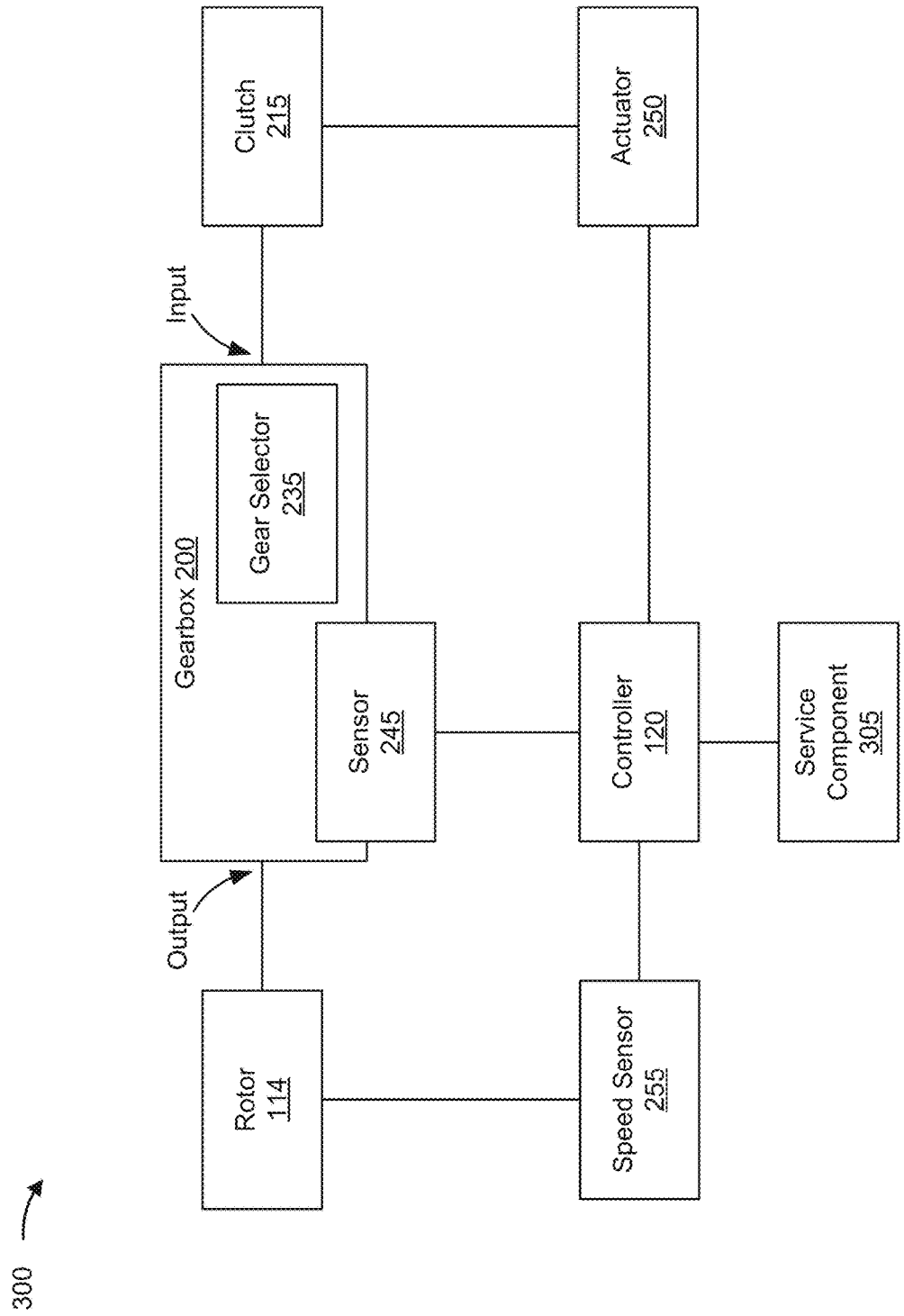
FIG. 3 is a diagram of an example gearbox calibration system, described herein.

FIG. 3 is a diagram of an example gearbox calibration system 300 described herein. The gearbox calibration system 300 may include the gearbox 200 and the gear selector 235, the clutch 215, the rotor 114, and/or the at least one sensor 245, as described herein.

The gearbox calibration system 300 may include an actuator 250 (e.g., a solenoid valve). The actuator 250 may control engagement of the clutch 215 to the power source 106. For example, the actuator 250 may control the flow of hydraulic fluid to the clutch 215. The actuator 250 may have an on state, where in the on state, the clutch 215 is moved to a first position (e.g., hydraulic fluid flows to the clutch 215 in the on state). The actuator 250 may have an off state, where in the off state, the clutch is moved to a second position (e.g., the flow of hydraulic fluid to the clutch 215 is ceased in the off state).

The gearbox calibration system 300 may include a speed sensor 255. The speed sensor 255 is configured to detect a rotational speed of the rotor 114, and to generate a signal indicative of the rotational speed of the rotor 114. In some examples, the speed sensor 255 may be configured to detect a rotational speed of the gearbox 200 (e.g., at an input or an output of the gearbox 200).

The gearbox calibration system 300 may include the controller 120, as described herein. The controller 120 may be operatively coupled to the sensor(s) 245, the actuator 250, and/or the speed sensor 255. The controller 120 may be configured to perform a calibration procedure for the gearbox 200. The controller 120 may receive a command (e.g., via an operator control of the machine 100) to perform the calibration procedure, and the controller 120 may perform the calibration procedure in response to the command.

In an operation of the calibration procedure, the controller 120 may determine whether one or more initialization conditions for the calibration procedure are satisfied. The one or more initialization conditions may include a condition that the machine 100 is stationary, a condition that a temperature of a hydraulic fluid of the machine 100 satisfies a threshold value, or the like.

In an operation of the calibration procedure, the controller 120 may cause the gearbox to shift (e.g., select) between at least the first gear ratio and the second gear ratio one or more times. For example, the controller 120 may cause the gearbox 200 to shift to the first gear ratio, then the controller 120 may cause the gearbox 200 to shift to the second gear ratio, then the controller may cause the gearbox 200 to shift to the first gear ratio, and so forth. In an example, when shifting between at least the first gear ratio and the second gear ratio one or more times, the controller 120 may cause the gearbox to shift to the first gear ratio at least two times or at least three times and to shift to the second gear ratio at least two times or at least three times. The controller 120 may cause the gearbox to shift to a gear ratio by providing a signal that causes actuation of the gear selector 235 (e.g., via the actuation shaft 240).

In an operation of the calibration procedure, the controller 120 may perform an operation for shift completion to a gear ratio (e.g., to ensure a full shift to the gear ratio whereby components of the gearbox 200 are aligned and fully engaged). For example, the controller 120 may perform the operation after each shift to a gear ratio, as described above. In other words, the controller 120 may perform the operation after the controller causes the gearbox to shift to the first gear ratio, the controller 120 may perform the operation after the controller causes the gearbox to shift to the second gear ratio, and so forth.

To perform the operation, the controller 120 may pulse the actuator 250 between the on state and the off state one or more times (e.g., after each shift to a gear ratio). To pulse the actuator 250, the controller 120 may cause the actuator 250 to switch back and forth between the on state and the off state, thereby causing movement of the clutch 215 (e.g., between the first position and the second position of the clutch 215). In particular, the pulsing of the actuator 250 imparts a rocking motion into the clutch 215 and in turn the gearbox 200. This small amount of gearbox input caused by the pulsing allows for the components of the gearbox 200 to align and fully engage. Additionally, or alternatively, to perform the operation, the controller 120 may cause actuation of the gear selector 235 to a shifted gear ratio one or more additional times (e.g., after commanding actuation of the gear selector 235 to the first gear ratio, the controller 120 may command actuation of the gear selector 235 to the first gear ratio one or more additional times before shifting to the second gear ratio) and/or may cause activation of a device coupled (e.g., directly or indirectly) to the input of the gearbox 200 to thereby impart a small amount of gearbox input, among other examples. The device may be configured to rotate or vibrate. For example, the device may be a motor, such as a hydraulic motor or an electric motor.

After each shift to a gear ratio, the controller 120 may perform the operation (e.g., pulse the actuator 250) until a speed (e.g., a rotational speed) of the rotor 114 (or of the gearbox 200) satisfies a threshold value. In some examples, the controller 120 may pulse the actuator 250 (e.g., if the speed does not satisfy the threshold value) until a threshold quantity of pulses are performed (e.g., a threshold quantity of on states of the actuator 250). The controller 120 may obtain a signal indicative of the speed of the rotor 114 from the speed sensor 255. In some examples, the controller 120 may perform the operation (e.g., pulse the actuator 250) until the rotor 114 achieves a non-zero speed, a speed of at least 1 revolution per minute (RPM), a speed of at least 2 RPM, a speed of at least 3 RPM, or the like.

In an operation of the calibration procedure, the controller 120 may obtain a first set of position data that identifies respective first positions of the gear selector 235 for each shift to the first gear ratio, and a second set of position data that identifies respective second positions of the gear selector 235 for each shift to the second gear ratio. For example, after a shift to the first gear ratio (and, in some examples, after performing the operation, such as pulsing the actuator 250), the controller 120 may identify a position of the gear selector 235 for inclusion in the first set of position data. Continuing with the example, after a shift to the second gear ratio (and, in some examples, after performing the operation, such as pulsing the actuator 250), the controller 120 may identify a position of the gear selector 235 for inclusion in the second set of position data.

The controller 120 may obtain the first set of position data and the second set of position data using the sensor 245. For example, the controller 120 may receive a signal from the sensor 245 in connection with a shift to a gear ratio, and the controller 120 may identify the position of the gear selector 235 based on the signal. The signal may indicate a value representative of the position of the gear selector 235, and/or the controller 120 may determine a value representative of the position of the gear selector 235 based on the signal. In some examples (e.g., if the sensor 245 is an inductive sensor), the sensor 245 outputs pulse width modulation (PWM) signals based on a distance between the sensor 245 and the gear selector 235. Here, a position of the gear selector 235 may be represented by a duty cycle value (e.g., a percentage) based on a PWM signal. The duty cycle value may be an average duty cycle of the PWM signal over a particular time period (e.g., beginning after a shift to a gear ratio).

In an operation of the calibration procedure, the controller 120 may determine whether to pass or to fail the first set of position data and/or the second set of position data (e.g., the controller 120 may perform validation of the data). The controller 120 may determine to pass the first set of position data if the respective first positions identified for the gear selector 235 are represented by values that are within a threshold range of each other (e.g., a difference between any two of the values is less than a threshold value) and/or if the values each satisfy a first threshold value (e.g., for the low gear ratio, the values are below a maximum duty cycle value). The controller 120 may determine to pass the second set of position data if the respective second positions identified for the gear selector 235 are represented by values that are within the threshold range of each other (e.g., a difference between any two of the values is less than the threshold value) and/or if the values each satisfy a second threshold value (e.g., for the high gear ratio, the values are above a minimum duty cycle value). The controller 120 may determine to fail the first set of position data if the respective first positions are represented by values that are not within the threshold range of each other and/or if at least one of the values does not satisfy the first threshold value. The controller 120 may determine to fail the second set of position data if the respective second positions are represented by values that are not within the threshold range of each other and/or if at least one of the values does not satisfy the second threshold value.

In an operation of the calibration procedure, if the controller 120 determines to fail the first set of data and/or the second set of data (e.g., the calibration procedure failed), the controller 120 may provide an indication of a calibration error (e.g., the controller may provide the indication based on satisfaction of one or more of the conditions for failing the first set of data and/or the second set of data, as described above). For example, the controller 120 may cause information indicating the calibration error to be displayed in the operator cab 104, cause activation of an indicator (e.g., a warning light) of the operator cab 104 indicative of the calibration error, and/or cause a notification indicating the calibration error to be transmitted to a device associated with an operator, an owner, a technician, or the like, of the machine 100, among other examples.

In an operation of the calibration procedure, if the controller 120 determines to pass the first set of data and the second set of data (e.g., the calibration procedure succeeded), the controller 120 may determine a calibration for the gearbox 200 (e.g., the controller may determine the calibration based on a determination that one or more of the conditions for passing the first set of data and/or the second set of data are satisfied, as described above). The controller 120 may determine a first calibrated position of the gear selector 235 for the first gear ratio based on the first set of position data. For example, the first calibrated position may be an average of the values representative of the first positions of the first set of position data or may be a particular one of the values (e.g., a highest value, a lowest value, a median value, a modal value, or the like). The first calibrated position may represent a position of the gear selector 235 that is indicative of a complete shift of the gearbox 200 to the first gear ratio. The controller 120 may determine a second calibrated position of the gear selector 235 for the second gear ratio based on the second set of position data. For example, the second calibrated position may be an average of the values representative of the second positions or may be a particular one of the values. The second calibrated position may represent a position of the gear selector 235 that is indicative of a complete shift of the gearbox 200 to the second gear ratio. In some examples, the first calibrated position may be the lowest value from the first set of position data and the second calibrated position may be the highest value from the second set of position data.

The controller 120 may cause information identifying the first calibrated position and the second calibrated position to be stored to a memory. The first calibrated position and the second calibrated position may be used during subsequent operation of the machine 100. For example, in connection with a shift to the first gear ratio, the controller 120 may monitor (e.g., using the sensor 245) whether the position of the gear selector 235 corresponds to (e.g., is the same as, or is within a particular tolerance of) the first calibrated position. Similarly, in connection with a shift to the second gear ratio, the controller 120 may monitor (e.g., using the sensor 245) whether the position of the gear selector 235 corresponds to (e.g., is the same as, or is within a particular tolerance of) the second calibrated position.

If, in connection with a shift to a gear ratio, the position of the gear selector 235 does not correspond to a calibrated position (e.g., the shift is incomplete), the controller 120 may perform one or more remedial actions. For example, the controller 120 may pulse the actuator 250, as described above, until the position of the gear selector 235 corresponds to the calibrated position. That is, pulsing of the actuator 250 may cause a small amount of gearbox input that causes the gear selector 235 to move to a fully engaged position, as described above. As another example, the controller 120 may cause information indicating the incomplete shift to be displayed in the operator cab 104, cause activation of an indicator (e.g., a warning light) of the operator cab 104 indicative of the incomplete shift, and/or cause a notification indicating the incomplete shift to be transmitted to a device associated with an operator, an owner, a technician, or the like, of the machine 100, among other examples.

As shown, in some examples, the gearbox calibration system 300 may include a service component 305 (e.g., implementing a service tool). The service component 305 may include a device (e.g., associated with a technician of the machine 100) communicatively connected to the machine 100 (e.g., via the controller 120). Alternatively, the service component 305 may be a component of the machine 100. The service component 305 may perform one or more operations of the calibration procedure, as described herein.

While the gearbox calibration system 300 is described herein with reference to the first gear ratio and the second gear ratio of the gearbox 200, the gearbox calibration system 300 may be used in connection with any quantity of gear ratios. For example, the gearbox calibration system 300 may include a gearbox capable of operating using more than two gear ratios (e.g., three gear ratios, four gear ratios, or five gear ratios) and/or a gearbox that utilizes multiple gear selectors. Here, the calibration procedure may be performed with respect to each gear selector of the gearbox, in a similar manner as described above.

As indicated above, FIG. 3 is provided as an example. Other examples may differ from what is described with regard to FIG. 3.

Figure 4:
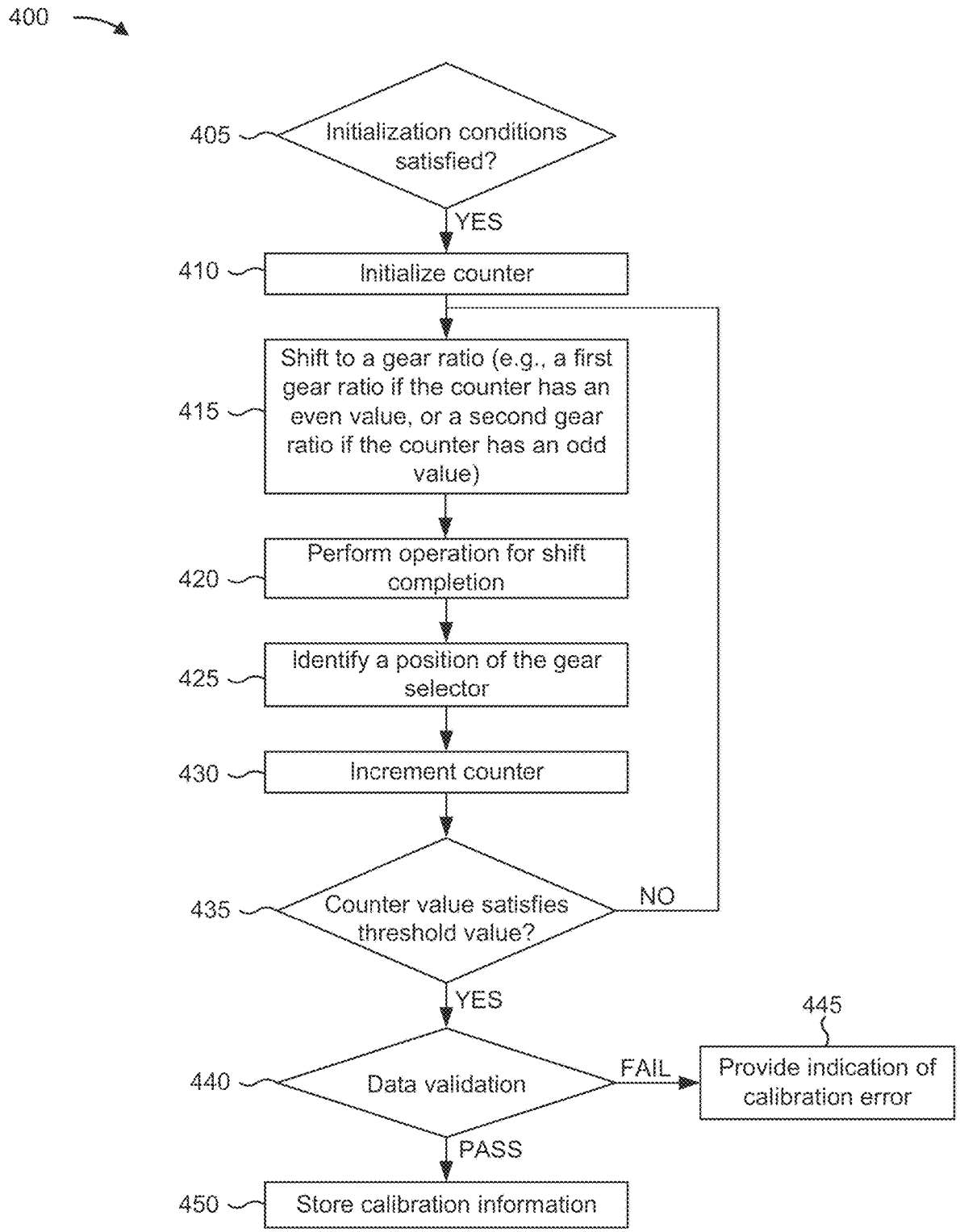
FIG. 4 is a flowchart of an example process relating to gear shift calibration, described herein.

FIG. 4 is a flowchart of an example process 400 for gear shift calibration. One or more process blocks of FIG. 4 may be performed by a controller (e.g., controller 120) of a machine (e.g., machine 100). The machine may include a power source, a clutch, an actuator for the clutch, a gearbox having a gear selector, and/or a rotor, as described above. Additionally, or alternatively, one or more process blocks of FIG. 4 may be performed by another device or a group of devices separate from or including the controller, such as another device or component that is internal or external to the machine.

Process 400 may include determining whether one or more initialization conditions are satisfied (block 405), in a similar manner as described above. If the initialization conditions are not satisfied, then process 400 may be ended. If the initialization conditions are satisfied (block 405—YES), then process 400 may include initializing a counter (block 410). For example, the counter may be initialized to a value of zero.

Process 400 may include shifting to a gear ratio (block 415), in a similar manner as described above. For example, if a value of the counter is an even number, then the shift may be to a first gear ratio, and if the value of the counter is an odd number, then the shift may be to a second gear ratio. Process 400 may include performing an operation for shift completion (block 420), in a similar manner as described above. For example, performing the operation may include pulsing the actuator, where the actuator may control engagement of the rotor to the power source. In particular, the actuator may control the clutch, as described above.

Process 400 may include identifying a position of the gear selector (block 425), in a similar manner as described above. For example, a value representative of the position of the gear selector may be stored in a first set of position data (e.g., a first array) if the gear ratio is the first gear ratio or in a second set of position data (e.g., a second array) if the gear ratio is the second gear ratio.

Process 400 may include incrementing the counter (block 430). That is, a value of the counter may be increased by one. Process 400 may include determining whether the value of the counter satisfies a threshold value (block 435). For example, the threshold value may be a value that results in three shifts to the first gear ratio and three shifts to the second gear ratio. If the value of the counter does not satisfy the threshold value (block 435-NO), then process 400 may return to block 415. If the value of the counter satisfies the threshold value (block 435—YES), then process 400 may include validating the position data (block 440), in a similar manner as described above. For example, the first set of position data and the second set of position data may be passed or failed, in a similar manner as described above.

If the position data fails data validation (block 440—FAIL), then process 400 may include providing an indication of the calibration error (block 445), in a similar manner as described above. If the position data passes data validation (block 440—PASS), then process 400 may include storing calibration information (block 450). For example, the calibration information may include a first calibrated position for the gear selector based on the first set of position data and a second calibrated position for the gear selector based on the second set of position data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The gearbox and/or gearbox calibration system described herein may be used with any machine that utilizes a transmission. For example, the gearbox and/or gearbox calibration system may be used with a machine that utilizes a transmission to provide a drive ratio for a work implement, such as a rotor of a rotary mixer or cold planer. Thus, the gearbox and/or gearbox calibration system has application in road repair, road reclamation, surface milling, surface pulverization, or the like.

As described above, sometimes, a shift to a gear ratio of a gearbox may be incomplete (e.g., due to improper calibration and/or due to deviation from a previous calibration), which can result in damage to the gears or other components of the gearbox. The gearbox described herein may include a contactless sensor to detect a position of a gear selector of the gearbox. The contactless sensor may facilitate detection of the position of the gear selector without impeding, or otherwise affecting, movement and gear selection performed by the gear selector.

Moreover, gear shift calibration may be performed using the sensor of the gearbox. For example, the calibration procedure described herein may be performed using the sensor. The calibration procedure may be used to determine a calibrated position of the gear selector (e.g., relative to a gear or a set of gears) that is associated with a full shift to a gear ratio (e.g., full engagement of the gear, full meshing of the set of gears, or the like) of the gearbox. The calibration procedure described herein provides fast, efficient, and accurate calibration for gear shifting. Moreover, in operation, one or more remedial actions may be taken if a shift to the gear ratio does not achieve the calibrated position of the gear selector. The remedial actions may ensure a full shift to the gear ratio, thereby reducing or preventing damage to the gears or other components of the gearbox.

What is claimed is:

1. A gearbox calibration system, comprising:
a gearbox configured to operate using at least a first gear ratio and a second gear ratio,
the gearbox including a gear selector configured to select the first gear ratio or the second gear ratio for the gearbox;
at least one sensor configured to detect a position of the gear selector;
a rotor drum coupled to an output of the gearbox; and
a controller configured to:
cause the gearbox to shift between the first gear ratio and the second gear ratio one or more times;
obtain, using the at least one sensor, a first set of position data that identifies respective first positions of the gear selector for each shift to the first gear ratio, and a second set of position data that identifies respective second positions of the gear selector for each shift to the second gear ratio; and
determine a first calibrated position of the gear selector for a shift to the first gear ratio based on the first set of position data and a second calibrated position of the gear selector for a shift to the second gear ratio based on the second set of position data.

2. The gearbox calibration system of claim 1, wherein the controller is further configured to:
perform an operation for shift completion after each shift between the first gear ratio and the second gear ratio.

3. The gearbox calibration system of claim 1, wherein the controller is further configured to:
provide an indication of a calibration error based on at least one of:
the respective first positions are represented by values that are not within a threshold range of each other,
the respective second positions are represented by values that are not within the threshold range of each other,
at least one of the respective first positions is represented by a value that does not satisfy a threshold value, or
at least one of the respective second positions is represented by a value that does not satisfy another threshold value.

4. The gearbox calibration system of claim 1, wherein the at least one sensor is configured to detect the position of the gear selector without contacting the gear selector.

5. The gearbox calibration system of claim 1, wherein the at least one sensor is an inductive sensor.

6. The gearbox calibration system of claim 1, wherein the at least one sensor outputs pulse width modulation signals that are based on a distance between the gear selector and the at least one sensor, and
wherein the respective first positions are represented by first duty cycle values based on the pulse width modulation signals, and the respective second positions are represented by second duty cycle values based on the pulse width modulation signals.

7. The gearbox calibration system of claim 1, wherein gear selector is a shift fork.

8. The gearbox calibration system of claim 1, further comprising:
a speed sensor configured to detect a rotational speed of the rotor drum.

9. A method, comprising:
causing, by a controller, a gearbox coupled to a rotor to shift between a first gear ratio and a second gear ratio one or more times;
obtaining, by the controller using at least one sensor, a first set of position data that identifies respective first positions of a gear selector of the gearbox for each shift to the first gear ratio, and a second set of position data that identifies respective second positions of the gear selector of the gearbox for each shift to the second gear ratio; and
determining, by the controller, a first calibrated position of the gear selector for a shift to the first gear ratio based on the first set of position data and a second calibrated position of the gear selector for a shift to the second gear ratio based on the second set of position data.

10. The method of claim 9, further comprising:
determining that one or more initialization conditions are satisfied before causing the gearbox to shift between the first gear ratio and the second gear ratio the one or more times.

11. The method of claim 9, further comprising:
performing an operation for shift completion after each shift between the first gear ratio and the second gear ratio.

12. The method of claim 11, wherein performing the operation for shift completion after each shift between the first gear ratio and the second gear ratio comprises:
pulsing an actuator, for a clutch coupled to the gearbox, between an on state and an off state one or more times after each shift between the first gear ratio and the second gear ratio.

13. The method of claim 9, further comprising:
causing information identifying the first calibrated position and the second calibrated position to be stored to a memory.

14. The method of claim 9, wherein the first calibrated position and the second calibrated position are determined based on a determination that at least one of:
the respective first positions are represented by values that are within a threshold range of each other,
the respective second positions are represented by values that are within the threshold range of each other,
the respective first positions are represented by values that each satisfy a threshold value, or
the respective second positions are represented by values that each satisfy another threshold value.

15. A rotary mixer, comprising:
a gearbox configured to operate using at least a first gear ratio and a second gear ratio,
the gearbox including a gear selector configured to select the first gear ratio or the second gear ratio for the gearbox;
a rotor coupled to an output of the gearbox;
a clutch coupled to an input of the gearbox;
an actuator configured to control the clutch;
a sensor configured to detect a position of the gear selector; and
a controller configured to:
cause the gearbox to shift between the first gear ratio and the second gear ratio one or more times;
pulse the actuator between an on state and an off state one or more times after each shift between the first gear ratio and the second gear ratio;
obtain, using the sensor, a first set of position data that identifies respective first positions of the gear selector for each shift to the first gear ratio, and a second set of position data that identifies respective second positions of the gear selector for each shift to the second gear ratio; and determine a first calibrated position of the gear selector for a shift to the first gear ratio based on the first set of position data and a second calibrated position of the gear selector for a shift to the second gear ratio based on the second set of position data.

16. The rotary mixer of claim 15, wherein the actuator is pulsed until a speed of the rotor satisfies a threshold value.

17. The rotary mixer of claim 15, wherein the actuator is pulsed until a quantity of pulses satisfies a threshold value.

18. The rotary mixer of claim 15, wherein the gearbox is a constant mesh gearbox.

19. The rotary mixer of claim 15, wherein the sensor is disposed on the gearbox remotely from the gear selector.

20. The rotary mixer of claim 15, wherein the controller, to cause the gearbox to shift between the first gear ratio and the second gear ratio one or more times, is configured to:
   cause the gearbox to shift to the first gear ratio at least two times and to shift to the second gear ratio at least two times.

* * * * *